C. V. HOOVER AND C. K. SCHENCK.
AUTOMATIC WINDOW LOCK.
APPLICATION FILED NOV. 15, 1918.
1,357,636.
Patented Nov. 2, 1920.
2 SHEETS—SHEET 2.
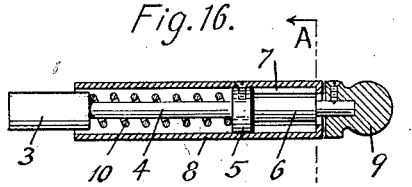 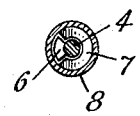
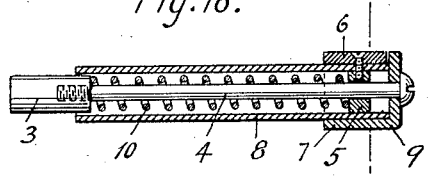 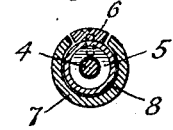
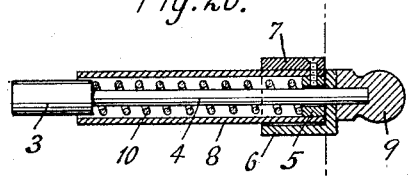 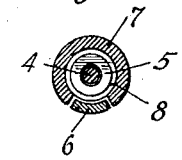
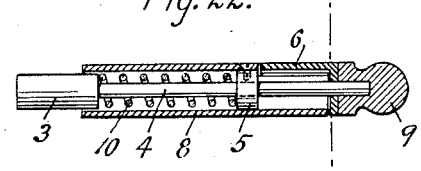 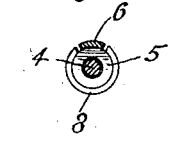
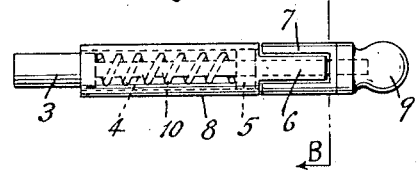 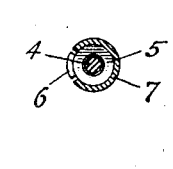
WITNESSES
INVENTORS

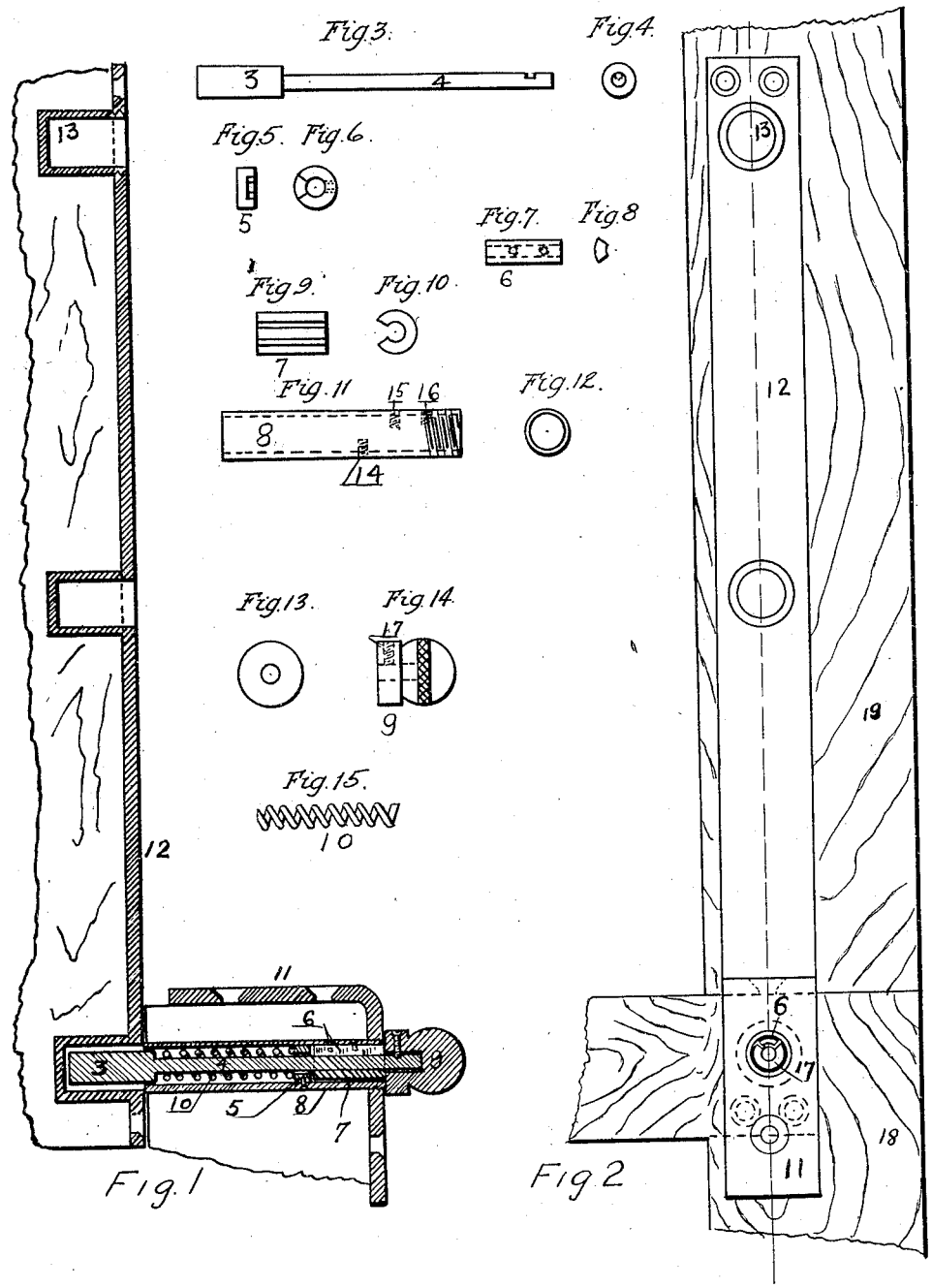

UNITED STATES PATENT OFFICE.

CLARA VELORA HOOVER AND CHRISTIAN KILIAN SCHENCK, OF NEW YORK, N. Y.

AUTOMATIC WINDOW-LOCK.

1,357,636.  Specification of Letters Patent.  Patented Nov. 2, 1920.

Application filed November 15, 1918. Serial No. 262,635.

*To all whom it may concern:*

Be it known that we, CLARA VELORA HOOVER and CHRISTIAN KILIAN SCHENCK, citizens of the United States, and residents, respectively, of New York, in the county of New York and State of New York, and of New York, in the county of New York and State of New York, have invented a certain new and useful Automatic Window-Lock, of which the following is a specification.

Our invention relates to window locks and has for its object to provide a simple construction whereby the window will be automatically locked in its closed position against opening from the outside and against undesired raising from the inside, for instance, by children. Our invention contemplates further the provision of a construction whereby the window may be efficiently locked in a plurality of partly open positions. Other more specific objects will appear from the description hereinafter and the features of novelty will be pointed out in the appended claims.

Reference is to be had to the accompanying drawings, which illustrate examples of our invention, and in which Figure 1 is a vertical section showing parts of the upper and lower sashes, with our invention applied thereto; Fig. 2 is a face view, with the handle for operating the locking member removed; Figs. 3 to 15 inclusive are detail views illustrating individual elements of our invention and Figs. 16 to 25 are detail views showing variations of our improvement.

As shown in Figs. 1 and 2, the window-lock comprises a locking-member or bolt 3 located at one end of a rod 4 which passes through a sleeve 7 having a sector removed to form a recess as shown in Figs. 9 and 10, the sleeve 7 being secured upon the rod 4 in any suitable manner to move therewith; an actuating handle 9 is located at the free end of the rod 4 and is held thereon against displacement in an axial direction by a screw 17 the inner end of which extends into a cut in said rod 4.

The bolt 3 and its coöperating parts are slidably mounted in a tube 8 which extends transversely through the lower sash 18 and has its one end in screw-threaded engagement with a corner plate 11 secured to said sash, as shown in Fig. 1; as shown in said figure, the bolt 3, in its normal locking position, projects beyond the lower sash, the handle 9 lying against the plate 11 and arresting the outward movement of said bolt. The device includes further a circular stop 5 fixed within the tube 8 by means of a screw 14 and having an axial opening through which the rod 4 extends. The circular stop 5 is provided with a notch as shown in Figs. 5 and 6 in which the end of a guide stop 6 is located, the stop 6 being fixed within the tube 8 by screws 15 and 16 and comprising a sector arranged to fit within the recess of the sleeve 7 as shown in Fig. 1; the outer end of the sector-stop 6 is preferably located near the outer end of the tube 8 and is always so positioned as to maintain the bolt 3 in a retracted position within the tube 8 as will be more fully described hereinafter. A coil spring 10 is located within the tube 8 and has its one end in engagement with the bolt 3 and its other end in contact with the circular stop 5; the tension of said spring 10 is such as to maintain the bolt 3 in its locking position and to return it thereto.

As shown in Figs. 1 and 2, the upper sash 19 is provided with a metallic plate 12 secured in position in any suitable manner as by screws and having a plurality of sockets 13 located at intervals throughout its length; the sockets 13 may comprise integral parts of said plate 12 or they may be separate elements in screw-threaded connection therewith as shown at the upper end of Fig. 1. In any case, the sockets 13 are arranged so as to be successively and individually brought into registry with the bolt 3, which, in its locking position, extends into one of said sockets, as shown in Fig. 1; in other words, one of said sockets is located so as to register with said bolt when the window is closed while the other sockets are so arranged as to register with said bolt in different partly open positions of the window.

In the normal position of the parts, as shown in Fig. 1, the bolt 3 by projecting into a socket 13 securely locks the two sashes 18 and 19, together, and thus prevents the same from being raised or lowered relatively to each other. It will be noted that the tube 8 extends into engagement with the plate 12 and thus prevents any manipulation of the bolt 3 from the outside, through the medium of an instrument inserted between the meeting rails of the sashes 18 and 19.

To unlock the window the bolt 3 is withdrawn from the socket 13 by means of the handle 9 and rod 4 against the tension of the spring 10 until the inner end of the sleeve 7 which moves with said rod 4 has passed beyond the outer end of the sector or guide stop 6. The sleeve 7 is then rotated about its axis to bring its sector recess out of registry with said stop 6 which now engages the end of said sleeve 7 and thereby maintains the bolt 3 in its retracted position in which the sashes are freely movable relatively to each other.

In order to again bring the bolt 3 to its locking position the sleeve 7 is again rotated in either direction until its sector recess registers with the guide stop 6 whereupon, under the influence of the spring 10, the bolt 3 will immediately be moved to its operative position, carrying with it the rod 4, sleeve 7 and handle 9 in a return movement. During the described rotation of the sleeve 7 the stop 6 forms a bearing for the end of said sleeve so that the coöperative engagement of the stop 6 with the sector recess of the sleeve 7 is automatic under the action of the spring 10 in respect to the secondary movement and requires no careful manipulation in order to bring these elements into proper registry with each other as is the case in existing constructions.

By sliding the bolt 3 into one or the other of said sockets 13 the window may be securely locked against unintentional opening in either a closed position or in one of any number of different open positions.

In the form shown in Figs. 16 and 17, the sector sleeve 7 is secured within the tube 8 and the stop 6 is carried by the rod 4; this arrangement is the reverse of the one shown in Figs. 1 and 2.

In Figs. 18 and 19, the stop 6 is secured upon the outside of the tube 8 and the sleeve 7 is carried by the rod 4 and is slidable over said tube 8.

In Figs. 20 and 21, the sleeve 7 is located and secured upon the tube 8 and the stop 6 is carried by the rod 4, this form being the reverse of the one shown in Figs. 18 and 19.

In Figs. 22 and 23, the sleeve 7 with a sector removed comprises a part of the tube 8 and the stop 6 is carried by the rod 4, and fits into said sector, in the operative position of the bolt as shown in Fig. 22.

In Figs. 24 and 25, the stop 6 is made an integral part of the tube 8, and projects therefrom as shown in Fig. 24, and the sleeve 7 is carried by the rod 4, this arrangement being a reversal of that shown in Figs. 22 and 23.

In all other respects the construction and operation of the above variations may be the same as the form first described.

In all of its forms, the device is efficient and reliable, is automatic in action, and requires no careful manipulation in order to bring about the desired operations.

Various changes in the specific forms shown and described may be made within the scope of the claims without departing from the spirit of our invention.

We claim:

1. A window-lock comprising a socket located on one sash, a bolt slidably mounted on the other sash and coöperating with said socket to lock said sashes against relative movement, a fixed stop and a sleeve having a recess arranged to fit said stop, said sleeve being rotatable relatively to said fixed stop to maintain said bolt in its inoperative position or to permit it to move to its operative position.

2. A window-lock comprising a plurality of sockets on the upper sash, a tube extending transversely through the lower sash, a fixed stop secured to said tube, a bolt slidable therein, a rod carrying said bolt, a spring whereby said bolt is maintained in and returned to its locking position, and a sleeve carried by said rod and having a sector removed to form a recess fitting said fixed stop, said sleeve being slidable lengthwise of said stop and rotatable thereon as a bearing to bring the recess of said sleeve into and out of registry with said stop, whereby said bolt is maintained in an inoperative position or permitted to move to its operative position.

3. A window-lock comprising a socket located on one sash, a tube carried by the other sash, a bolt slidable axially of said tube and coöperating with said socket to lock said sashes against relative movement, and devices connected with said tube and bolt and comprising a stop and a coöperating sleeve, one of said devices being rotatable relatively to the other to maintain said bolt in its inoperative position or to permit it to move to its operative position, relatively to the other device.

Signed at New York, in the county of New York and State of New York, this 11 day of November, A. D. 1918.

CLARA VELORA HOOVER.
CHRISTIAN KILIAN SCHENCK.

Witnesses:
AMELIA W. SCHENCK,
GEORGE A. SCHENCK.